Figure 1:
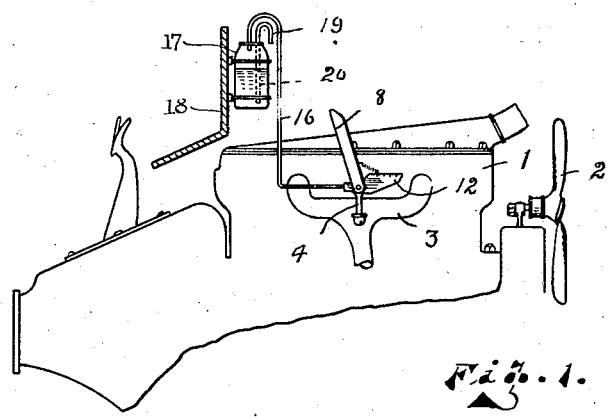

May 15, 1928.

D. R. COLLINS

HUMIDIFIER

Filed Sept. 13, 1926

1,670,141

Inventor
DAVID R. COLLINS
By Geo. Stevens
Attorney

Patented May 15, 1928.

1,670,141

UNITED STATES PATENT OFFICE.

DAVID R. COLLINS, OF DULUTH, MINNESOTA.

HUMIDIFIER.

Application filed September 13, 1926. Serial No. 134,979.

This invention relates to internal combustion engine feeds and has special reference to such a device for the automatic control of an auxiliary air supply for the intake of such engine.

The principal object is to provide simple, automatic means for the control of such auxiliary air supply.

Another object is to provide simple means of moistening such auxiliary air supply, the benefits of both of which objects are well known to those versed in the art.

Other objects and advantages of the invention will appear in the further description.

Figure 2:
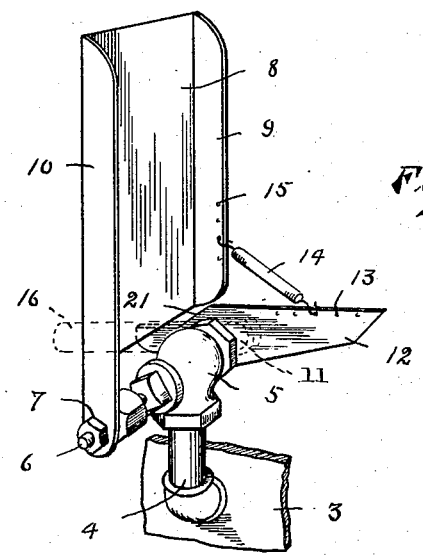

Referring now to the accompanying drawing, forming part of this application, and wherein like reference characters indicate like parts:

Figure 1 is a side elevation of the upper portion of an automobile engine having the invention applied thereto; and Figure 2 is an enlarged perspective view of the automatic controlling mechanism.

1 represents the engine, 2 the fan for same, and 3 the intake manifold. Just above the central portion of the manifold and supported upon a suitable pipe connection indicated at 4 upon the side thereof is the horizontally disposed valve 5. 6 represents the stem of the valve by which passage therethrough is controlled, and upon the outer end of this stem is securely attached in any desired manner, as for example by two jam nuts, the outer one of which is illustrated at 7, the flat wind controlled vane 8, having side flanges 9 and 10 thereupon. This vane is disposed above the valve so as to face the fan 2 of the engine, so that air coming from the fan when the latter is in operation will cause the vane to rock backwardly therefrom and thus open the valve 5.

Upon the opposite end of the valve 5 to that from which the stem 6 protrudes is the necessary feed pipe connection including the nipple 11, and upon which is mounted in close proximity to the valve the thin flat arm 12, projecting both forwardly and rearwardly of the valve, the former being considerably more extensive than the later and provided with a series of small holes along its uppermost edge as indicated at 13, these being for the purpose of receiving one end of a contractile helical spring 14, the opposite end of which is similarly engageable with the flange 9 of the wind vane, it also being provided with a series of holes indicated at 15, such series, as is obvious, being for any desired adjustment of the spring in respect to the force and side of the fan employed upon the engine to which the attachment may be fixed.

The air supply pipe is indicated at 16 and leads above and down into the top of the water tank 17 fixed to the dash board 18 of the automobile, or, as is obvious, any other convenient support adjacent the engine. In this instance the tank 17 is preferably in the form of a glass container, for example like a fruit jar, the end of the pipe 16 being attached to and protruding through the cover thereof but not into the liquid within the tank, and this liquid may be either water or any other fluid known to be beneficial for use in the engine. The air supply pipe to the tank 17 is illustrated at 19 and is preferably of inverted U-shape with one end open to the atmosphere and the other end terminating within the tank 17 adjacent the suction end of the pipe 16, but to this end of the air supply pipe is attached preferably a flexible tube 20 leading to the bottom of the tank so that air when drawn into the tank must pass through the liquid therein, and such air when withdrawn from the tank through the pipe 16 will become more or less impregnated with the liquid in the tank, which, if consisting of plain water, will simply add moisture to the air, as it is drawn into the manifold of the engine.

From the above it is evident that when an engine thus equipped is started the action of the air thrust backwardly by the fan will cause the vane 8 to lean backwardly in respect of course to the tension of the spring 14, and thus correspondingly open the valve 5, permitting of the functioning of the auxiliary air supply to the manifold, and provision is made against opening too far of the valve by the lower edge of the vane 8 contacting the rearward stepped projection of the arm 12. It will be noted that the upper edge of this arm, intermediate of its stepped portions, is inclined, as at 21, so that the spring 14 may not draw the vane to an abnormally closed position, and which will assure its operation at all times.

Having thus described my invention, what I claim and desire to secure by Letters Patent, is

In a humidifying device, a valve control mechanism of the type described comprising in combination a valve having intake and discharge connections, a wind controlled vane mounted upon the controlling stem of the valve for operating same, a combined anchoring means and stop for cooperative engagement with the vane carried by the valve, and a spring member connecting the vane with the anchoring means for normally holding the valve closed.

In testimony whereof I affix my signature.

DAVID R. COLLINS.